2,946,207
MOLD FOR FROZEN CONFECTIONS

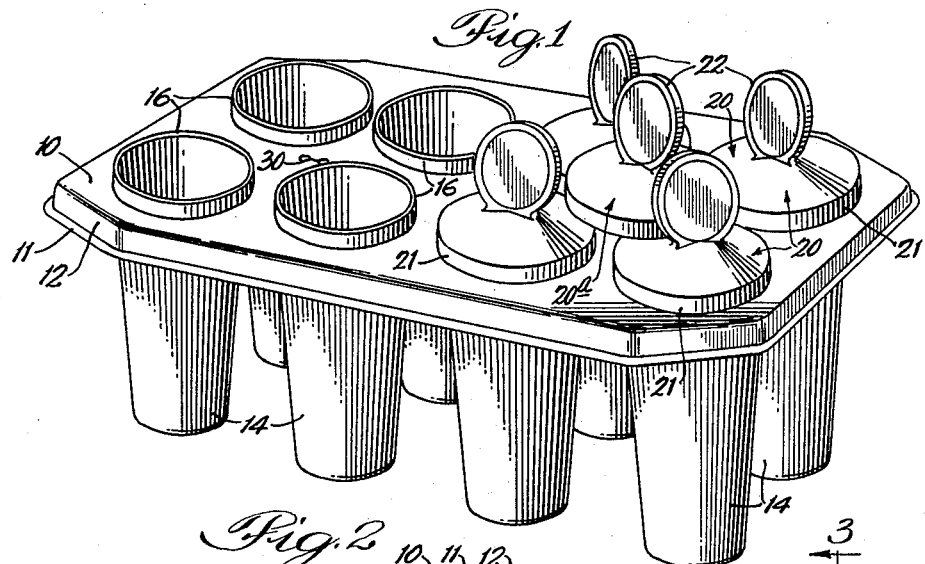
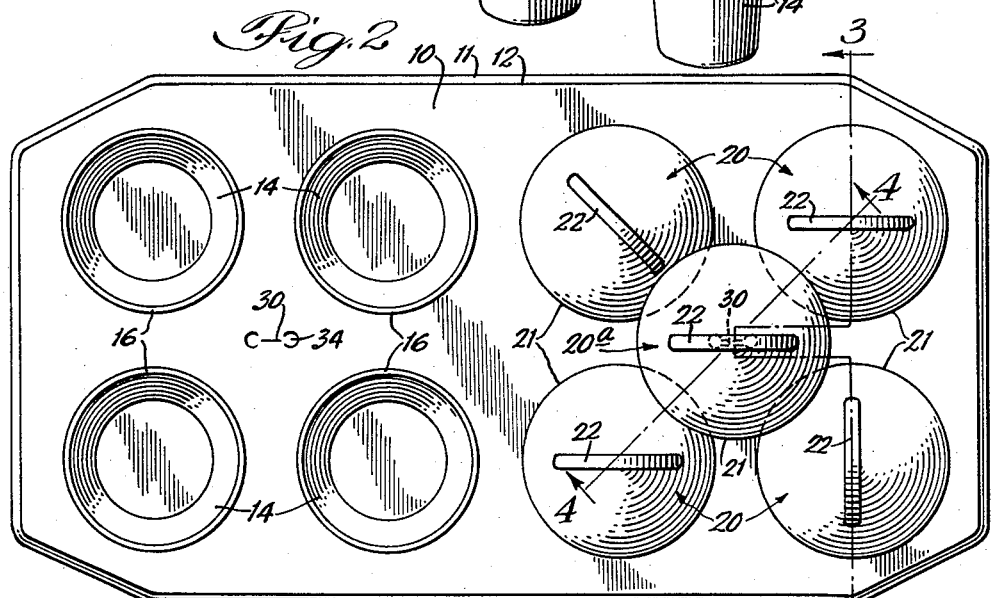
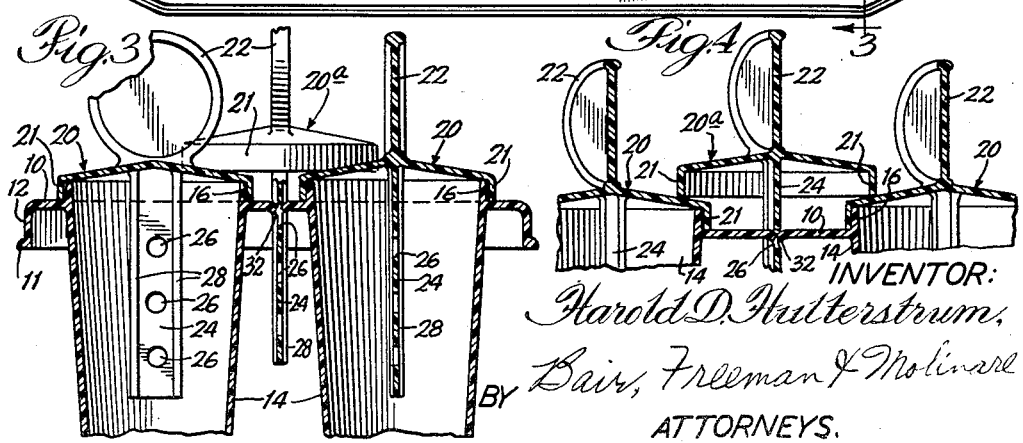

Harold D. Hulterstrum, Baraboo, Wis., assignor to Flambeau Plastics Corporation, Baraboo, Wis., a corporation of Wisconsin Filed Feb. 29, 1960, Ser. No. 11,506

4 Claims. (Cl. 62—355)

This invention relates to a plastic mold for making frozen confections such as flavored ice on a stick. The mold of the present invention facilitates freezing flavored liquids in a home refrigerator. It consists of a plurality of individual cups molded integrally with a plastic web or sheet which holds the cups in spaced relation. Each cup has a lid or cap with a stick-like arm depending therefrom. The liquid is poured into the cup, the cap is placed over the cup with the arm immersed in the liquid. The mold is then placed in the refrigerator to freeze the flavored liquid to ice. When the frozen confection has been removed from the cup the cap serves as a handle and the frozen article is supported by the arm projecting from the cap. The cap serves as a shield to prevent melted ice from running down the hand or fingers.

The lids or caps are adapted to rest on the top edge of the cup or on the web which is spaced slightly below the top edge of the cup. During shipment prior to sale and in storage the caps are likely to become separated from the cups and become lost. It is the object of this invention to provide one or more extra covers with each mold and to use the extra cover to hold the others in place. By reason of this invention the removable covers for each of the cups is secured in place so that they will not become separated from the mold.

The invention will be beter understood from the following description when read in conjunction with the accompanying drawings, wherein:

Figure 1 is a perspective view of a frozen confection mold constructed in accordance with the invention;

Figure 2 is a plan view of the mold shown in Figure 1;

Figure 3 is a sectional view, partly broken away, taken along the line 3—3 of Figure 2, the sectional line being angular to show the connection between the mold and the extra cover; and Figure 4 is a sectional view, partly broken away, taken along the line 4—4 of Figure 2.

The mold proper consists of a plurality of cups 14 consisting of tapered cylinders which are molded integrally with a web or sheet 10. The cups project above the plane of the web 10 to provide an upright flange 16 which holds the cover described below in place. The web 10 has a depending flange 12 which terminates in a bead 11. The flange and bead serve to rigidify the mold so that it can be handled with ease when the cups are filled with flavored liquid. The integral cups and web may be molded from a resilient thermoplastc resinous material such as polyethylene, polypropylene, polystyrene, plasticized polyvinyl chloride and the like. In the particular form shown in the drawing the mold was eight cavities or cups arranged in two rows of four each. It will be understood, however, that the cups may be arranged in groups in any suitable pattern and the number may vary from four or six up to twelve or more.

Each of the individual cups 14 has its own cap 20. Each cap has a depending flange 21 which is adapted to fit over the upwardly projecting flange 16 and a depending arm 24 which extends down into the cavity or cup. When the cup is filled with liquid and is frozen, it is supported by the arm 24. It will be noted that each arm 24 has one or more openings 26 extending therethrough. This permits the ice to freeze through these openings so that it will not slide from the arm. The arm 24 has thickened axial edges 28 to rigidify it. Each of the caps 20 is crowned with a circular handle 22. The shape of the handle, of course, is not critical and may be rectangular, triangular or any other desired shape.

In order to hold the caps 20 in place I have provided an auxiliary cap, identified as 20a, which is identical in construction with the caps 20. The only difference is in its assembled location. The cap 20a is centrally located between the group of four cups at the right end of the mold. The arm 24 depending from the cap 20a is disposed within a slit-like passage 30. Because the arm 24 has a thickened bead 28 along each longitudinal edge, the slit-like passage 30 terminates in complementary openings 34 which receive these thickened edges. The opposed lips 32 of the slit-like passage 30 snap through the opening 26 in the arm 24 to lock the cap 20a in fixed position overlying a portion of each of the caps 20 forming the group of four just mentioned. Because the web 10 is made from resilient material, the cap 20a may be removed from the slit-like passage 30 by pulling with some force on the handle 22. This causes the lips 32 of the slit to separate and release the cap. The top opening 26 through the arm 24 is so located that it will become aligned with the lips 32 when the cap 20 is pressed snugly against the top surfaces of the adjacent caps 20 over which cap 20a lies. The cap 20a also serves as a spare in the event that one of the caps becomes lost.

In the drawing only the right-hand group of four cups is illustrated with the caps in assembled position. It will be understood, however, that the group of four cups comprising the left section of the mold is adapted to cooperate with caps 20 and another cap 20a in exactly the same manner as those described in conjunction with the right half of the mold.

From the foregoing description it will be apparent that I have provided an improved mold construction wherein extra or spare caps are efficiently utilized to lock the primary caps for each cavity or cup in assembled position. Other modifications in the detailed construction for locking the cap 20a in place will become apparent to those skilled in the art. It is, therefore, my intention to cover any modifications that may be reasonably construed to come within the scope of the appended claims.

What I claim as new and desire to secure by Letters Patent of the United States is:

1. A mold for preparing frozen confections comprising a group of cups integrally molded with a web from resilient plastic material, each cup having a peripheral flange projecting above the plane of said web, a removable cover for each cup adapted to fit over said flange, an arm depending from said cover and having an opening therethrough, a slit-like passage through said web centrally disposed between the cups comprising said group and another cover overlying a portion of each of those covers comprising said group, the arm of said other cover being disposed within said passage and resiliently gripped thereby, whereby said other cover serves to hold said group of covers in place against said web.

2. The mold of claim 1 wherein said slit-like passage has a pair of opposed edges which snap into said opening through the arm of said other cover to lock said group of covers in place.

3. The mold of claim 2 wherein said arm has thickened axial edges and said slit-like passage has complementary openings for receiving said edges.

4. The mold of claim 1 in which there are two groups of cups, each group comprising four cups.

References Cited in the file of this patent

UNITED STATES PATENTS

| | | |
|---|---|---|
| 2,166,560 | Schmelzer | July 18, 1939 |
| 2,247,018 | Henning | June 24, 1941 |
| 2,285,149 | D'Arcey | June 2, 1942 |
| 2,380,117 | Maldonado | July 10, 1945 |
| 2,443,684 | Lazarus | June 22, 1948 |
| 2,447,170 | Dunmire | Aug. 17, 1948 |

FOREIGN PATENTS

| | | |
|---|---|---|
| 590,726 | France | Mar. 25, 1925 |